United States Patent [19]

Shimaya et al.

[11] Patent Number: 5,222,917
[45] Date of Patent: Jun. 29, 1993

[54] TENSIONER LEVER HAVING AN I-SHAPED SECTION

[75] Inventors: Kazuhiko Shimaya, Hidaka; Masaki Miyaji, Hanno, both of Japan

[73] Assignee: Tsubakimoto Chain Co., Osaka, Japan

[21] Appl. No.: 867,860

[22] Filed: Apr. 13, 1992

[30] Foreign Application Priority Data

Apr. 15, 1991 [JP] Japan .................. 3-033315

[51] Int. Cl.⁵ .................................. F16H 7/08
[52] U.S. Cl. ........................ 474/101; 474/111
[58] Field of Search ............ 474/101, 109–111, 474/113–117, 133–138, 140

[56] References Cited

U.S. PATENT DOCUMENTS

| | | | |
|---|---|---|---|
| 4,826,468 | 5/1989 | Friedrichs | 474/101 |
| 4,832,664 | 5/1989 | Groger et al. | 474/111 |
| 4,921,472 | 5/1990 | Young | 474/111 |

Primary Examiner—Thuy M. Bui
Attorney, Agent, or Firm—Howson & Howson

[57] ABSTRACT

A tensioner lever for applying tension to an endless power transmission in the form of a chain, belt or the like, comprises an elongated arm made of aluminum and having I-shaped cross-sections in section planes transverse to its direction of elongation.

1 Claim, 7 Drawing Sheets

TENSIONER LEVER HAVING AN I-SHAPED SECTION

BRIEF SUMMARY OF THE INVENTION

This invention relates to tensioners, and more particularly to an improved tensioner lever structure for use in a tensioner of the kind used to maintain tension in an endless chain or belt for transmitting power from one shaft rotating shaft to another.

Tensioners of the kind to which the invention relates have many applications. A typical example is the maintenance of tension in the timing belt on an internal combustion engine, i.e. the belt which connects a valve-operating cam shaft to a crankshaft.

It is conventional practice to apply a predetermined tension to a power transmission chain or belt in order to prevent skipping of chain or belt over sprocket teeth, or, in the case of a smooth belt, to prevent slipping. A typical tensioner assembly comprises a lever pivoting about a pin projecting from a fixed member, and a plunger which applies a force to the lever, causing the lever to bear against the chain or belt. A projecting force is typically applied to the plunger by a spring. In a particular class of tensioners known as hydraulic tensioners, a hydraulic fluid is used to control the rate of movement of the plunger so that it projects rapidly in order to apply a tensioning force quickly when slack is encountered, and withdraws slowly when excess tension is encountered.

A conventional tensioner lever comprises an elongated arm having, on its front face, a synthetic resin shoe which provides a guide surface for contacting the chain or belt. The plunger applies a tensioning force to the opposite side of the arm.

Important characteristics of the lever arm include high strength, small physical size and light weight, and ease of manufacture. Lever arms of the prior art have some of these attributes. However, none of them embodies all of these desirable attributes in a single lever arm construction.

The general object of this invention is to provide an improved arm for a tensioner lever, which has high strength so that it can withstand vibrations encountered in high performance engines, which is small and light in weight so that it can be used in small engines, and which is easy to manufacture.

The invention addresses these objects by providing an elongated tensioner lever arm, preferably made of cast aluminum, and having an I-shaped cross section in section planes traverse to the longitudinal direction of the arm. The I-shaped cross-section comprises two flanges connected by a web. One of the flanges provides a face against which a synthetic resin shoe lies.

The I-shaped structure can be small in size and light in weight for use in smaller engines and is still strong enough to withstand the vibrational forces exerted on it by the chain or belt. The arm structure can be easily cast in a split mold.

Other objects, features and advantages of the invention will become apparent from the following detailed description when read in conjunction with the accompanying drawings.

DETAILED DESCRIPTION

Figure 4:
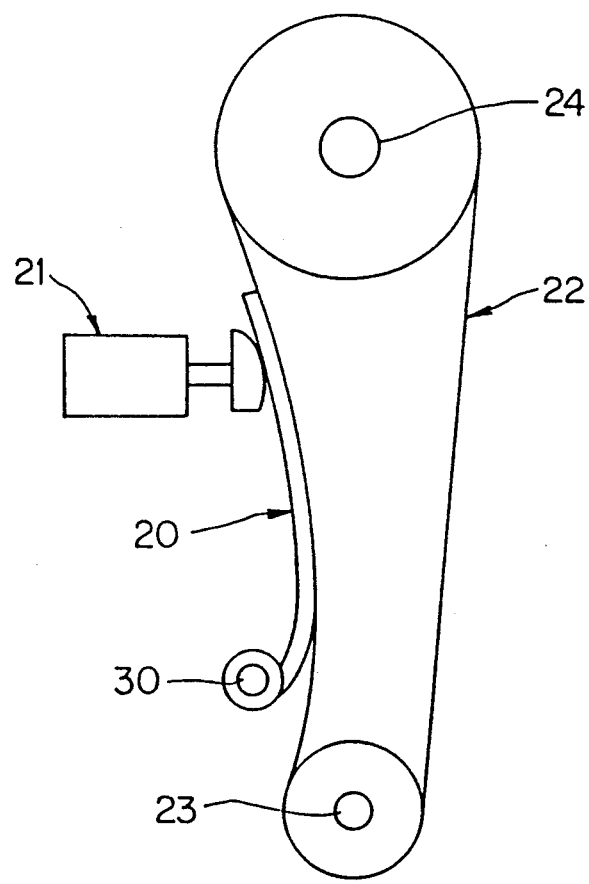
FIG. 4 is a schematic view illustrating a typical tensioner device transmitting power between two rotating shafts.

FIG. 4 shows a tensioner 21 applying pressure to a tensioner lever 20 which bears against an endless chain 22, preventing the chain from vibrating. Chain 22 transmits the rotation of a crankshaft 23 to a camshaft 24. Tensioner lever 20 is pivoted on a pin 30 projected from a fixed member (not shown), typically a part of an engine block or a bracket mounted thereon.

Various forms of conventional tensioner levers are shown in FIGS. 5 to 12.

Figure 5:
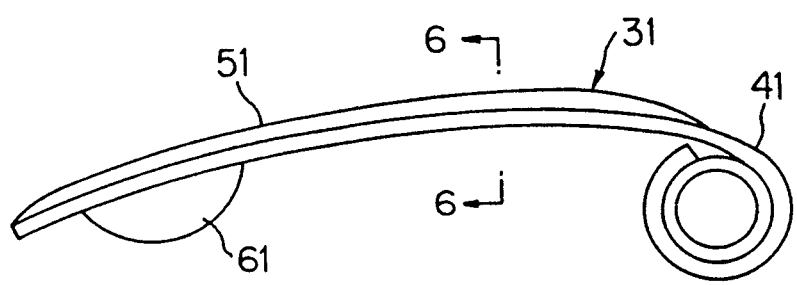
FIG. 5 is an elevational view of the first type of tensioner lever in accordance with the prior art.
Figure 6:
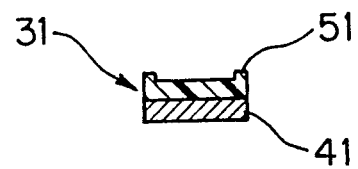
FIG. 6 is a sectional view taken on plane 6—6 of FIG. 5.

FIGS. 5 and 6 show a tensioner lever 31 comprising an arm 41, a synthetic resin chain-engaging shoe 51 on one face of the arm, and a pad 61 on the opposite side of the arm for engagement by the plunger (not shown) of a plunger assembly. Arm 41 is formed from sheet metal, and has no reinforcements to resist bending or twisting. Consequently, it is not strong enough to withstand the vibrations of the chain, when used in a high performance engine.

Figure 7:
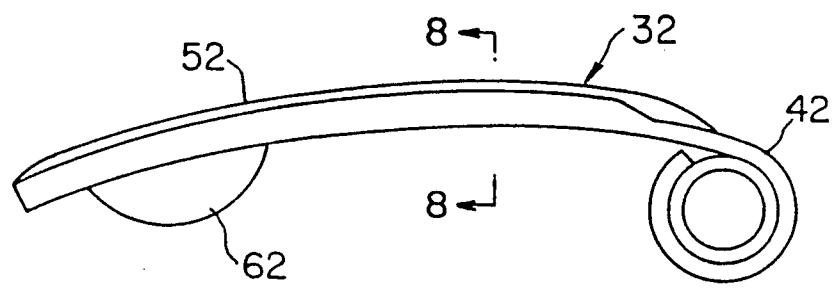
FIG. 7 is an elevational view of a second type of tensioner lever in accordance with the prior art.
Figure 8:
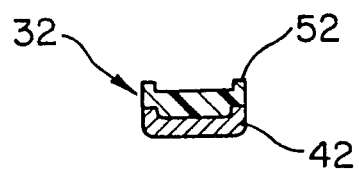
FIG. 8 is a sectional view taken on plane 8—8 of FIG. 7.

FIGS. 7 and 8 show a tensioner lever 32 comprising an arm 42, a shoe 52 and an pad 62. Arm 42 is a sheet of metal formed so that it has a U-shaped cross-section, as seen in FIG. 8. The U-shaped cross-section provides arm 42 strength far greater than that of the arm of FIGS. 6 and 7. However, the arm is difficult to manufacture, as it requires several sheet metal bending steps which are not easy to carry out, especially in view of the small size of the legs of the U-shaped cross-section, and the relatively small spacing between them.

Figure 9:
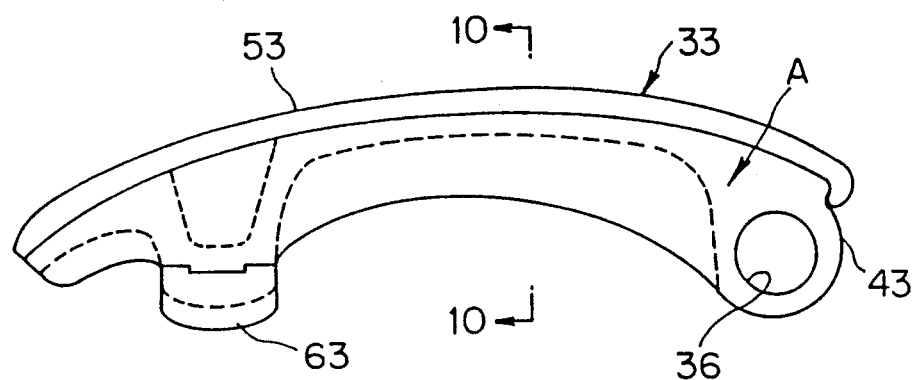
FIG. 9 is an elevational view of a third type of tensioner lever in accordance with the prior art.
Figure 10:
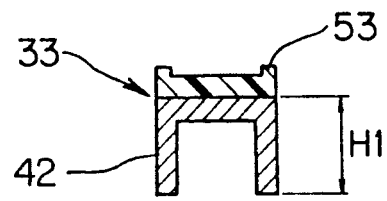
FIG. 10 is a sectional view taken on plane 10—10 of FIG. 9.

FIGS. 9 and 10 show a tensioner lever 33 comprising an arm 43, a shoe 53 and a pad 63. Arm 43 is an aluminum casting having a U-shaped cross-section. Arm 43 provides adequate strength and is easily manufactured. However, the height "H1" of the legs of the U-shaped cross-section is large, and incompatible with miniaturization. Furthermore, at the pivot end of arm 43, the thickness of the material must be sufficient to provide adequate strength in the portion of the casting forming the periphery of pin-receiving aperture 36. Because of the increased thickness required at the pivot end of the arm, segregation can occur in the casting process. Segregation is a phenomenon in which different portions of a casting take on different physical characteristics by reason of the fact that molten metal coagulates more rapidly at the locations of thin portions of the casting than at the locations of thicker portions. In the case of arm 43, segregation can occur at location "A", with the result that the casting may not achieve the desired strength.

Figure 11:
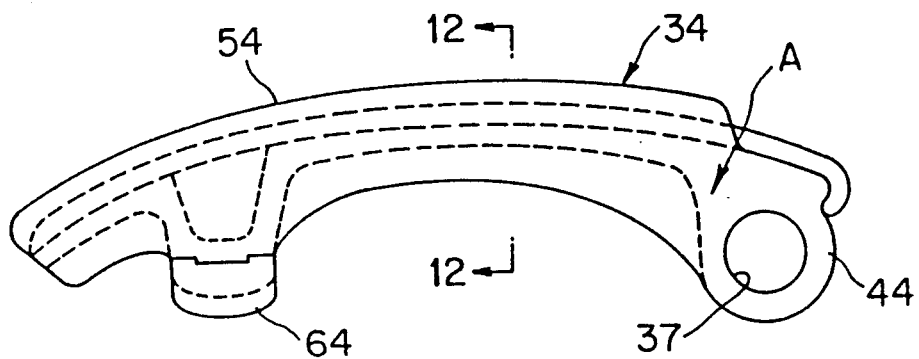
FIG. 11 is an elevational view of a fourth type of tensioner lever in accordance with the prior art.
Figure 12:
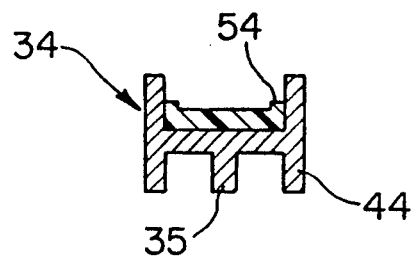
FIG. 12 is a sectional view taken on plane 12—12 of FIG. 11.

FIGS. 11 and 12 show a tensioner lever 34 comprising an arm 44, a shoe 54, and a pad 64. Arm 44 is an aluminum casting having an H-shaped cross-section and a centrally located reinforcing rib 35. Arm 44 provides adequate strength and is small enough to be compatible with miniaturization. However, the more complicated shape of arm 44 makes it difficult to mold. Furthermore, arm 44 is subject to the same problem of segregation as is the arm of FIGS. 9 and 10.

Figure 1:
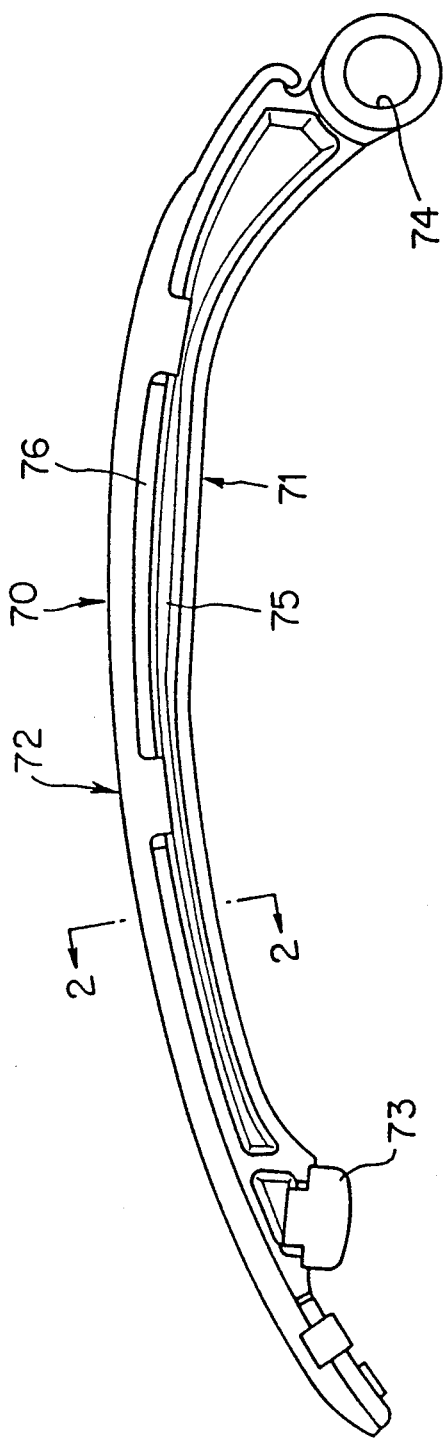
FIG. 1 is a front elevational view of a tensioner lever according to the present invention.
Figure 2:
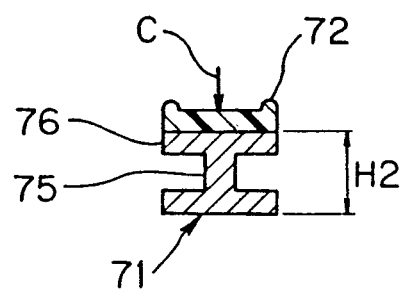
FIG. 2 is a sectional view taken on plane 2—2 of FIG. 1.
Figure 3:
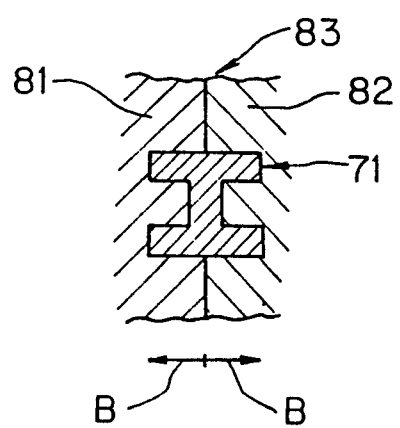
FIG. 3 is a fragmentary cross sectional view showing a split mold for casting the I-shaped arm.

As shown in FIGS. 1 to 3, tensioner lever 70, which is in accordance with the invention, comprises an arm 71, a synthetic resin shoe 72 and a pad 73. Arm 71 is cast from aluminum and has an I-shaped cross section in section planes traverse to its longitudinal direction. The I-shaped cross-section comprises two parallel flanges connected by a centrally located web 75, which extends perpendicularly between the flanges. As shown in FIG. 2, upper flange 76 provides a face against which shoe 72 lies. The arm is manufactured by the use of a split die casting mold 83 comprising two mold parts 81 and 82, which are separable from each other in the directions indicated by arrows "B" in FIG. 3.

The invention provides a lever arm which is easy to manufacture and which has high strength. Arm 71 can withstand a large force applied in direction "C", shown in FIG. 2, because of the compressive strength of web 75 and the resistance of web 75 to bending in directions parallel to its faces.

The wall thicknesses throughout the arm, including the thicknesses of the portions of the arm near pivot pin-receiving hole 74, are substantially uniform. Consequently the arm is not subject to diminished strength due to segregation occurring in the casting process.

The lever in accordance with the invention also can be made very small in size and light in weight, in the interest of miniaturization. More specifically, thickness "H2" of arm 71, as shown in FIG. 3, is approximately 0.6 times the corresponding thickness "H1" of arm 43 of the prior art tensioner lever 33 shown in FIG. 10.

In addition, if the strength of arm 71 is made equal to that of arms 43 and 44 of conventional levers 33 and 34, shown in FIGS. 9–12, a weight reduction of approximately 20 percent can be achieved by the use of the structure in accordance with the invention, as shown in FIGS. 1–3.

In summary, the arm of the invention is advantageous in that it is easily cast, not subject to diminished strength due to segregation occurring in the casting operation, highly resistant to bending under forces applied to the arm by the chain or belt, and capable of being made very small in size and light in weight.

Various modifications can be made to the lever arm of FIGS. 1–3. For example, the upper and lower flanges can be of different shapes and sizes. The thickness H2, shown in FIG. 2 can be uniform throughout substantially the entire length of the arm. These and other modifications which will occur to those skilled in the art can be made to the device described without departing from the scope of the invention as defined in the following claims.

We claim:

1. A tensioner lever for applying tension to an endless power transmission in the form of a chain, belt or the like, comprising an elongated arm made of aluminum, said arm having two opposite ends and comprising first and second, spaced flanges, each having and outer face and an inner face, the inner faces of the respective flanges being opposed to each other, and each of said first and second flanges also having opposite side edges extending generally in the direction of elongation of the arm, and means providing a web connecting said flanges together, said web being situated substantially in a plane and also extending in the direction of elongation of the arm, the web extending from a location on the inner face of the first flange situated between the opposite side edges of the first flange to a location on the inner face of the second flange situated between the opposite side edges of the second flange, whereby said arm has I-shaped cross-sections in section planes transverse to the direction of elongation of the arm, said arm having pivoting means, located adjacent to one end thereof, for pivoting attachment of the arm to a fixed axis extending substantially perpendicular to said web, and means, comprising a shoe, made of synthetic resin material and lying against the outer face of the first flange, and fixed to said first flange, for sliding engagement with a chain, belt or the like.

* * * * *